May 12, 1959  H. WURZEL  2,885,770
TOOLS FOR ASSEMBLING RETAINING RINGS
Filed March 26, 1958

INVENTOR
HUGO WURZEL
BY
ATTORNEY

United States Patent Office 2,885,770
Patented May 12, 1959

2,885,770

TOOLS FOR ASSEMBLING RETAINING RINGS

Hugo Wurzel, Bronx, N.Y., assignor to Waldes Kohinoor, Inc., Long Island City, N.Y., a corporation of New York Application March 26, 1958, Serial No. 724,077

2 Claims. (Cl. 29—229)

This invention relates to improvements in a tool for assembling retaining rings, and more specifically to a tool for assembling internal self-locking retaining rings in operative position within a housing bore.

As is well known, the so-called self-locking retaining ring comprises a closed ring body having a plurality of inclined resilient prongs extending radially from its outer edge (in the case of the internal ring), the free ends of the prongs extending as tangents (or arcs) of a circle having slightly greater diameter than that of the bore of the housing in which the ring is to be assembled. Accordingly, when such a ring properly faced is pushed into its bore, the prongs yield to allow ring passage, but upon the ring body engaging the machine part for which the ring is to serve as a locating shoulder, and, more importantly, when thereafter the machine part exerts force on the ring body in the opposite direction, the prongs tend to straighten out and, in so doing, self-lock themselves to the bore wall.

A refined and highly effective form of such a self-locking retaining ring is disclosed and claimed in a copending Feitl application Serial No. 447,821, filed August 4, 1954 (which with the present application is commonly owned), according to which the ring body, rather than being planar as conventional, has concavo-convex, or more simply radial V-section and it is further featured by the locking prongs being inclined to the general plane of the ring body by substantially the same angle as the outer edge or rim portion (from which the prongs extend) is similarly inclined consequent to the aforesaid V-sectional configuration. Such a ring yields numerous advantages as compared to the prior internal self-locking rings. For example, when properly inserted into the housing bore with its apical edge facing the machine part to be located in the bore, it makes line contact only with said machine part; its ring body is substantially stiffer and hence stronger than the prior rings of similar type, and the angle that its prongs bear to the general plane of the ring body can be made considerably larger than that of the corresponding prong angle of the prior rings. On the other hand, these advantages can be realized only if the ring is properly assembled in the housing bore. For example, if not properly centered in the bore, the ring body will not make contact with the machine part throughout its full periphery, nor will the locking prongs exercise uniform locking effect on the bore surface engaged thereby.

Stated broadly, an object of this invention is the provision of a tool for properly and expeditiously assembling internal self-locking retaining rings, particularly of the type disclosed and claimed in the aforesaid Feitl application, in housing bores and similar applications wherein they are employed to form an internal shoulder for locating a machine part.

More particulary, the invention contemplates and aims to provide a simple hand tool for mounting an internal self-locking retaining ring as aforesaid in properly faced position with respect to the bore in which it is to be assembled, and which is further capable of inserting the ring into and guiding it along the bore until it contacts the machine part within the bore for which it is to serve as a locating shoulder, with assurance that it is properly centered within the bore, and thereupon of releasing the ring so that it may exercise its extended self-locking action.

A further important object of the invention is the provision of a hand tool for assembling internal self-locking retaining rings in the bore of housings and the like which is characterized by simple, foolproof design and inexpensive construction and which is further thoroughly dependable in its operation.

The above and other objects and advantages of a ring-assembling tool according to the invention will appear from the following detailed description in which reference is had to the accompanying drawing illustrative thereof, wherein.

Figure 1:
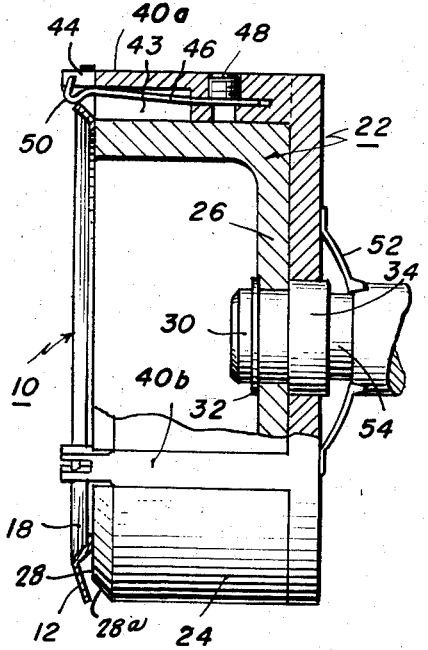
Fig. 1 is a part-sectional side elevation of a ring-assembly tool as herein proposed, the figure showing the tool mounting an internal self-locking retaining ring to be assembled in readiness for the assembly operation.

As explained in the foregoing, a ring-assembly or so-called applicator tool according to the present invention is peculiarly adapted to the assembly of internal spring retaining rings of the self-locking type disclosed in the aforementioned Feitl application Serial No. 447,821. As illustrated in the several views, such a ring, when of the internal type adapted to be assembled in a housing bore, comprises a closed ring body 10 from whose outer edge or rim extends a plurality of circumferentially spaced, radial locking prongs 12 which are disposed at an inclination to the ring body such that they yield during movement of the ring into and along a housing bore but tend to straighten out to the plane of the ring body and thereby lock themselves to the bore surface when force is applied to the ring body in direction tending to move it outwardly from the bore. Such a self-locking ring as shown is further featured by a ring body having radial V-section rather than being generally planar as is conventional. Thus, when assembled in the bore 14 of a housing 16 (Fig. 3), with its apical edge 18 faced inwardly relative of the bore, the ring makes line contact along said edge with the side face of a machine part 20 contained within the bore, for which the ring is intended to provide an artificial locating shoulder. As also seen in Figs. 1 and 3, the locking prongs 12 are inclined to the general plane of the ring body as a whole by the same angle that the outer edge or rim portion of the ring body is inclined to said plane consequent to the V-sectional configuration of said ring body, and accordingly the inclination of the prongs to the general plane of said ring body may be made substantially greater than is possible with the conventional self-locking ring.

The present invention provides a tool for assembling internal self-locking retaining rings as aforesaid within a housing bore corresponding to the aforesaid housing bore 14. That is to say, it operates as a means to insert a properly faced ring into and thereupon move it along the bore until it engages the machine part (such as 20) mounted therein and for which the ring is intended to provide a locating shoulder as aforesaid, with assurance that the ring is accurately centered with respect to both the bore and machine part; and thereupon to semi-automatically release said ring so that it may self-lock itself within the bore consequent to its resilient locking prongs biting into the material of the bore surface as they tend to straighten under force applied to the face of the ring in a direction as would otherwise cause it to creep or move outwardly along the bore.

Figure 3:
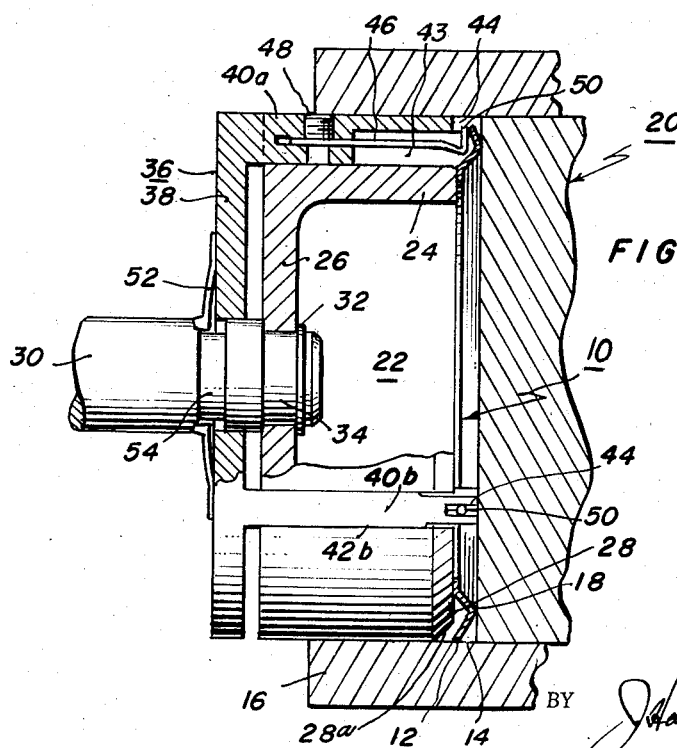
Fig. 3 is a part-sectional side elevational view showing the action of a ring assembling tool as herein proposed in performing the final step of assembling the mounted ring within a housing bore.

As best seen in Figs. 1 and 3, such a tool comprises a cup-shaped body member 22 defined by a cylindrical wall portion 24 which is open at its relatively inner end and an end wall 26 which forms an end closure for its relatively outer end. Said cylindrical portion 24 has outer diameter correspondingly substantially to the diameter of the housing bore 14 whereby, when the body member is bodily inserted into said bore as in Fig. 3, it is accurately centered therein, and its inner diameter is substantially less than the diameter of the inner edge or rim portion of the ring 10 to be assembled. Such makes for substantial wall thickness in said cylindrical portion, which is such that the open-end edge 28 of the body portion provides a highly effective annular seat for a ring to be assembled during its movement along the bore. To assure clearance between the outer ends of the ring prongs and said seat, the end edge 28 is provided with a chamfer 28a extending along its outer periphery, whereby the prongs of a seated ring may freely flex without any interference between their outer ends and the seat.

To facilitate handling of the tool, it is provided with an axially extending handle 30 which is affixed to the central or hub portion of the body-member end wall 26 as by a retaining ring 32 serving to clamp said wall against one radial end face of an enlarged collar-like abutment 34 provided on the handle end.

According to the invention, the tool body member 22 mounts means for releasably securing a ring seated on the open-end edge 28 of the body member as aforesaid. Illustratively, such means comprises an open or spider-like frame member 36 consisting of a disc-form end member 38 and a plurality (three) of arms 40a, 40b, 40c which are equidistantly spaced along the outer circumference of said member and extend axially-inwardly therefrom, the arms slidably engaging in axial slots 42a, 42b, 42c provided therefor in the outer periphery of the aforesaid cylindrical wall portion 24 of the body member 22 and being contained with said outer periphery. As best seen in Fig. 1, the axial length of said arms 40a–40c inclusive is greater than the axial dimension of the tool body member and hence, when the frame member is positioned with its disc member 38 disposed tight against the outer radial face of the end wall 26 of the tool body member (as in Fig. 1), the free or tip ends of said arms extend well beyond the open-end edge 28 (seat) of said body member against which a ring to be assembled seats as aforesaid.

Figure 2:
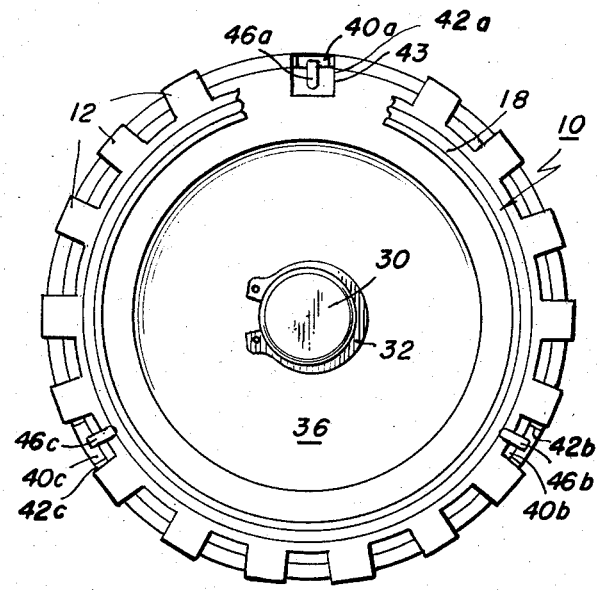
Fig. 2 is an end view of the tool and mounted ring looking into the left end of Fig. 1.

Preferably, the under faces of the inner or free ends of said arms 40a–40c inclusive are cut back so as to provide inwardly opening end recesses 43 and their extreme or tip ends are also radially slotted as at 44. Thus, each associated recess and slot accommodates a ring-securing spring finger 46 secured at its outer or rear end to the rear or butt end of an associated arm as by means of a screw 48 and whose inner free end is formed as an inwardly directed hook 50. The length of each said spring finger is of course such that its end hook 50 normally engages over the outer edge or rim of a ring on the seat 28, thereby to secure the ring to said seat. In the illustrated arrangement three such ring-securing spring fingers (designed 46a, 46b, 46c, Fig. 2) are provided, the spring fingers being accordingly spaced 120° apart. As will be clear from an analysis of Fig. 1, the spring fingers, while normally engaging the outer rim or edge of the ring seated on the end-edge 28 of the body member 22, may flex outwardly away from same, as is permitted by the arm-end slots 44, responsively to axial movement of the spring fingers in relative rearward direction (to the right, Fig. 1). The above of course assumes that the angular position of the fingers is such that each extends between two adjacent locking prongs of the ring, whereby their hooks engage the ring body rather than the prongs.

Again referring to Figs. 1 and 3, the disc member 38 of the ring securing and releasing means has sliding bearing on the aforesaid enlarged collar portion 34 of the handle 30, and it is normally pressed against the radial rear or outer face of the end wall 26 of the body member 22 as by suitable spring means, illustratively a bowed spring retaining ring 52 of the type disclosed and claimed in my prior Patent No. 2,755,698, dated July 24, 1956, whose inner edge seats in a groove 54 provided in the handle 30 outwardly of its enlarged collar portion 34 and whose outer edge engages with spring pressure against the outer radial face of the disc member 38. It will be understood that said bowed retaining ring 52 (or other spring means employed) normally biases the frame member 36 and the arms 40a–40c thereof to the extreme limit of their leftwise position (Fig. 1) relative to the body member 22, in which position the hook ends 50 of the spring fingers 46 normally secure the ring against the end edge 28 of said body member, but the ring also permits said frame member and its arms to retract relatively of said body member, for example, upon the extreme free ends of the arms 40a, 40b, 40c engaging against a relatively fixed planar surface such as the end face of a machine part 20.

While it is believed that the operation of a ring assembling or applicator tool of the invention will be clear from the above description, taken with the drawing, such is briefly detailed as follows: A ring 10 to be assembled is pre-centered with respect to the tool by the centering action of the free ends of the arms 40a–40c simply by placing it against the seat provided therefor by the end edge 28 of the body member 22, such placement of the ring on the seat being accomplished by outwardly flexing the spring fingers 46a–46c to permit seating of the ring, whereupon the spring fingers close with spring pressure on the outer edge or rim of the ring body and accordingly secure it to the seat. With the tool mounting the ring held by its handle 30, it is inserted in the housing bore 14, it being observed that, due to the fact that the free ends of the arms 40a–40c enter the housing bore ahead of the seating ring and the close fit of the tool body member in the bore, the tool and hence the ring 10 are accurately centered within the bore. Upon the tool being inserted to a position in the bore such that the projecting ends of the arms 40a–40c abut the machine part 20 therein, further axial pressure is applied by a forceful push on the handle 30, such resulting in retraction of the frame member 36 relative to the tool body member 22 against the bias of the spring 52. Consequent to this retracting movement, the spring fingers are flexed radially outwardly and in so doing release the ring, which latter is now disposed relatively forwardly of the fingers as seen in Fig. 3. A final push movement is now applied to the tool, such pressing the ring firmly against the machine part, a position which it proceeds to hold of its own accord, following withdrawal of the tool from the bore, consequent to the self-locking action of the ring prongs 12 as explained in the foregoing.

Without further analysis, it will be appreciated that a tool for assembling self-locking internal retaining rings in their bores as illustrated and described satisfies in simple and highly effective manner the objectives of such a tool as hereinbefore set forth. However, as many changes could be made in carrying out the above constructions without departing from the scope of the invention, it is intended that all matter contained in the above description or shown in the accompanying drawing shall be interpreted as illustrative and not in a limiting sense.

I claim:

1. A tool for assembling internal self-locking retaining rings characterized by a closed ring body and inclined resilient locking prongs extending radially outwardly therefrom in the bore of a housing wherein it is adapted to provide an internal locating shoulder for a machine part mounted within the bore comprising, in combination, a generally cup-shaped body member and a push handle extending axially from the closed end of said body member, the outer diameter of said body member corresponding substantially to the diameter of the housing bore and the inner diameter being no greater than the inner diameter of the ring body, the open-end edge of said body being shaped and dimensioned so as to provide an annular seat for the inner edge portion of said ring, and releasable securing means normally engaging the outer edge of said ring at circumferentially spaced points thereof located between adjacent prongs for securing the ring body to said seat and being also effective to release the ring responsive to insertion of said body member into the bore to a position in which the seated ring is about to engage the machine part, said means comprising a spider-like member in the form of a disc mounting a plurality of circumferentially spaced, axially extending arms slidable in slots provided in the outer periphery of said body member, said arms being contained within the circle of the outer periphery of the body member and having slightly greater length than said body member, whereby when said disc member is positioned against the closed end of the body member the free ends of said arms extend beyond the plane of the seated ring, spring fingers carried by said arms inwardly thereof, the free ends of said fingers normally gripping the outer edge of the ring body with spring pressure thereby to secure the ring to its seat, and spring means normally biasing said disc axially toward the closed end of the body member, the construction and arrangement being such that the free ends of said arms are adapted first to precenter the ring to be assembled with the tool and thereupon to engage the machine part contained within the bore just prior to engagement of the seated ring with said machine part, thereby to effect retraction of said arms relative to the body member and a corresponding retraction of the spring fingers to an inactive position.

2. A tool substantially as set forth in claim 1, wherein the spring fingers terminate at their free ends in inwardly directed hooks normally engaging over the outer edge of the ring body, and wherein retraction of said arms results in said free ends and hooks being flexed outwardly to an inactive position.

References Cited in the file of this patent
UNITED STATES PATENTS

| | | |
|---|---|---|
| 925,118 | Lyon | June 15, 1909 |
| 2,199,833 | Fleischman | May 7, 1940 |
| 2,357,139 | Seme | Aug. 29, 1944 |
| 2,510,206 | Barkan | June 6, 1950 |